UNITED STATES PATENT OFFICE.

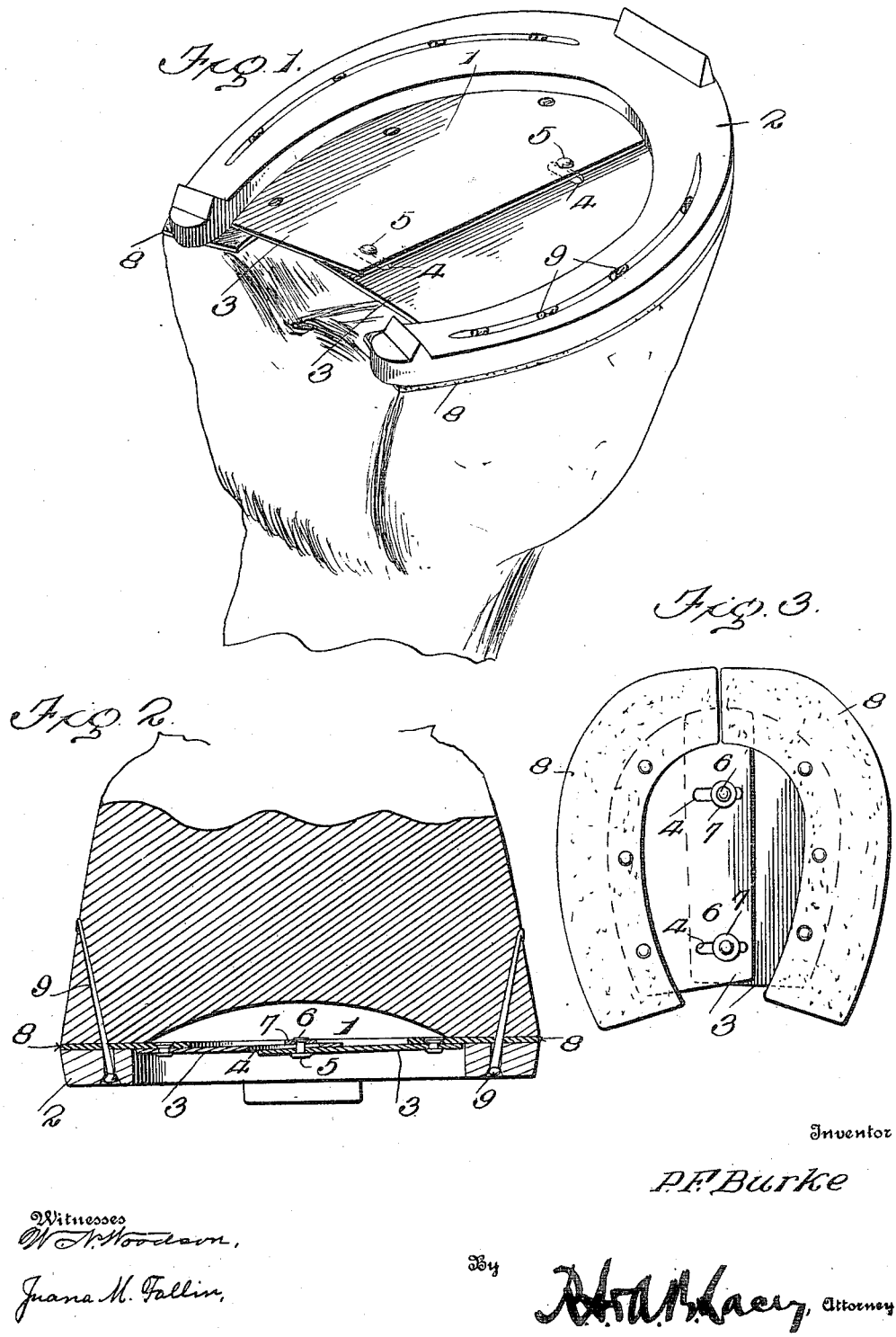

PATRICK F. BURKE, OF NEW YORK, N. Y.

ADJUSTABLE HOOF-PAD.

964,747.

Specification of Letters Patent. Patented July 19, 1910.

Application filed July 29, 1909. Serial No. 510,187.

*To all whom it may concern:*

Be it known that I, PATRICK F. BURKE, citizen of the United States, residing in New York city, in the county of New York and State of New York, have invented certain new and useful Improvements in Adjustable Hoof-Pads, of which the following is a specification.

This invention comprehends certain new and useful improvements in hoof attachments for horses and the like, and the invention has for its object an improved pad that is arranged to be secured across the sole of the hoof in order to protect the same from injury from nails or glass, or other sharp objects, and to further prevent stones becoming lodged in the cavity of the hoof.

With this and other objects in view that will more fully appear as the description proceeds, the invention consists in certain constructions and arrangements of the parts that I shall hereinafter fully describe and then point out the novel features of in the appended claim.

For a full understanding of the invention and the merits thereof and also to acquire a knowledge of the details of construction, reference is to be had to the following description and accompanying drawing, in which:

Figure 1 is a perspective view illustrating the application of my improved hoof pad; Fig. 2 is a transverse section thereof; and, Fig. 3 is a top plan view.

Corresponding and like parts are referred to in the following description and indicated in all the views of the drawing by the same reference characters.

My improved hoof pad consists essentially of a central shield plate 1 which is formed of sheet metal or the like and is arranged to extend across the sole of the hoof, so as to close the cavity therein and protect the same from injury. The plate conforms to the contour of the bottom of the hoof and is relatively smaller than the same, so as to fit within the shoe 2, as illustrated in Fig. 1.

For convenience the plate 1 is bisected longitudinally to form two complemental sections 3, the inner edge portions of which overlap. One of these sections is formed near its inner edge at longitudinally spaced points with short transverse slots 4 in which operate pins 5 secured in the overlapping portion of the other section, the pins being headed at their extremities, as indicated at 6, and having washers 7 mounted thereon between the heads and the adjacent section 3. By virtue of such an arrangement the central plate is rendered laterally extensible, so as to be adjusted to fit hoofs of different sizes.

The rim or attaching portion of the pad is made of leather or like flexible material and has the general contour of a shoe and extends along and projects beyond the margin of the shield plate 1, the rim being divided longitudinally at the front of the pad to provide separate strips 8 that are riveted or otherwise rigidly secured to the outer edges of the respective complemental sections 3. The forward ends of the strips extend over the overlapping inner edge portions of the sections 3, as shown in Fig. 3, and are unsecured to said sections, so not to interfere with the relative lateral movement thereof.

In practice the sections 3 are shifted so as to adjust the shield plate 1 to the size of the hoof to which the pad is to be applied. The pad is then placed on the hoof with the shield plate extending across and closing the cavity therein and with the flexible rim terminating flush with the outer surface of the hoof and interposed between the hoof and the shoe. The nails or other fastening devices 9 which attach the shoe 2 to the hoof, pass through the flexible rim, so as to also secure the pad in position and to maintain the sections 3 against relative lateral movement.

Attention is particularly directed to the fact that inasmuch as only the flexible rim portions of the pad are fastened to the hoof, the central plate 1 is afforded slight play, as is manifestly desirable.

From the foregoing description in connection with the accompanying drawing, it will be apparent that I have provided an improved hoof pad that may be employed with considerable advantage; that does not come directly in contact with the ground, and hence is not subjected to excessive wear; that embodies to a marked degree the characteristics of simplicity, durability and efficiency; and that may be easily and cheaply manufactured and readily applied.

Having thus described the invention what is claimed as new is:

As a new article of manufacture, an adjustable hoof pad comprising a metallic central shield plate divided longitudinally to form separate complemental sections having their inner edge portions overlapping and adjustably connected together for relative lateral movement to admit of the extension of the shield plate to fit hoofs of different sizes, and a flexible attaching rim having the general contour of a shoe and extending along and projecting beyond the margin of the shield plate and divided longitudinally at the front of the pad to form separate strips secured to the outer edges of the respective complemental sections, the forward end portions of said strips extending over the overlapping inner edge portions of the complemental sections and being unattached to said sections, so as not to interfere with the relative lateral movement thereof.

In testimony whereof I affix my signature in presence of two witnesses.

PATRICK F. BURKE. [L. S.]

Witnesses:
GEYER KLEIN,
GEORGE KOPP.